United States Patent [19]

Rumpf

[11] Patent Number: 5,451,009
[45] Date of Patent: Sep. 19, 1995

[54] SEAT BELT RETRACTOR WITH DUAL SENSITIVITY

[75] Inventor: Robert J. Rumpf, Grosse Point, Mich.

[73] Assignee: TRW Vehicle Safety Systems Inc., Lyndhurst, Ohio

[21] Appl. No.: 84,301

[22] Filed: Jun. 28, 1993

[51] Int. Cl.6 ............................................. B60R 22/38
[52] U.S. Cl. ............................ 242/383.1; 242/383.2
[58] Field of Search ......... 242/107, 107.4 R, 107.4 A, 242/107.4 B, 383.1, 383.2; 280/801 A, 806, 807

[56] References Cited

U.S. PATENT DOCUMENTS

| | | |
|---|---|---|
| 3,632,056 | 1/1972 | Hibbard et al. |
| 3,862,726 | 1/1975 | Ulrich et al. |
| 3,917,189 | 11/1975 | Bryll |
| 3,980,247 | 9/1976 | Kuszyncki et al. |
| 4,176,810 | 12/1979 | Bertrand et al. |
| 4,293,105 | 10/1981 | Weman |
| 4,456,195 | 6/1984 | Takada |
| 4,485,986 | 12/1984 | Sugimoto |
| 4,518,131 | 5/1985 | Butenop et al. |
| 4,560,115 | 12/1985 | Toyama et al. |
| 5,014,926 | 5/1991 | Rumpf et al. |

Primary Examiner—Daniel P. Stodola
Assistant Examiner—John P. Darling
Attorney, Agent, or Firm—Tarolli, Sundheim & Covell

[57] ABSTRACT

A seat belt retractor (12) has a web-sensitive locking mechanism (100) including a primary inertia member (112) which lags rotation of the retractor spool (32) upon acceleration of the spool (32) at a rate above a first predetermined rate. A lock bar (36) blocks rotation of the spool (32) in the unwinding direction when the primary inertia member (112) lags rotation of the spool (32). The retractor (12) also has a sensitivity adjusting mechanism (110) including a secondary inertia member (172). The secondary inertia member (172) has a loading condition in which its mass is applied to the primary inertia member (112) effectively to increase the inertia of the primary inertia member (112). The secondary inertia member (172) is switched into and out of the loading condition in response to rotation of the spool (32). This allows the retractor (12) to provide a low level of webbing sensitivity for the purpose of rapidly donning the seat belt webbing (20) and to provide a high level of webbing sensitivity for locking the retractor (12) in the event of a vehicle collision. The retractor (12) can also be mounted at any angle of inclination, and if mounted in an integrated seat, the retractor (12) will function at any seat back recline angle or yaw angle.

14 Claims, 6 Drawing Sheets

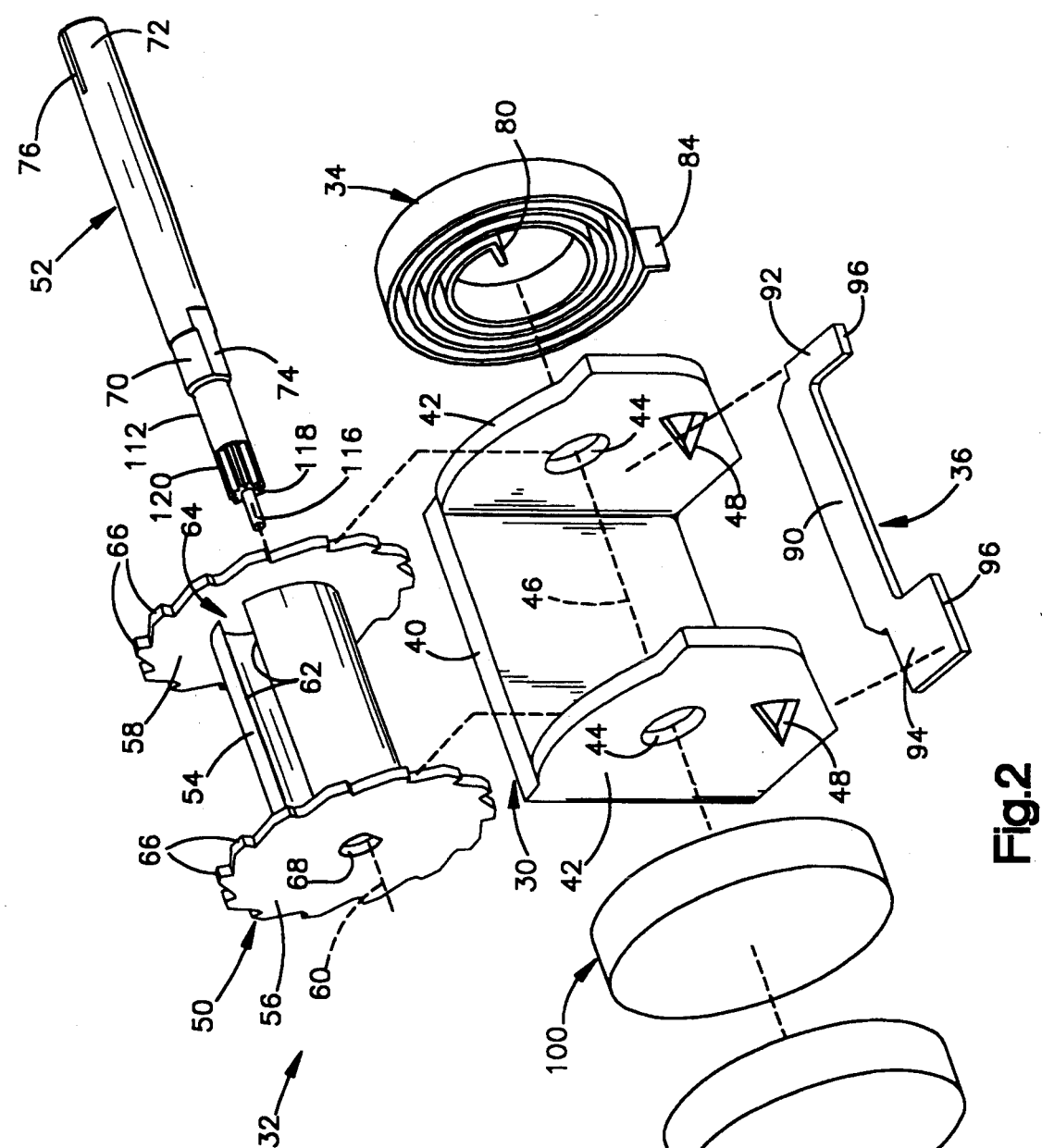
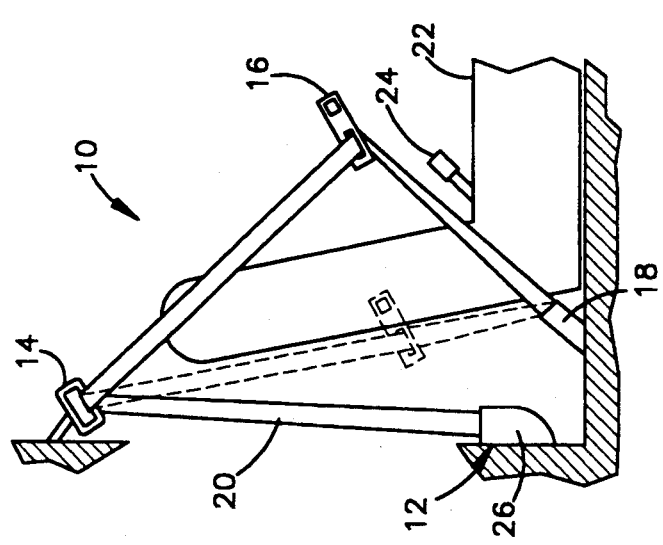
Fig.2
Fig.1

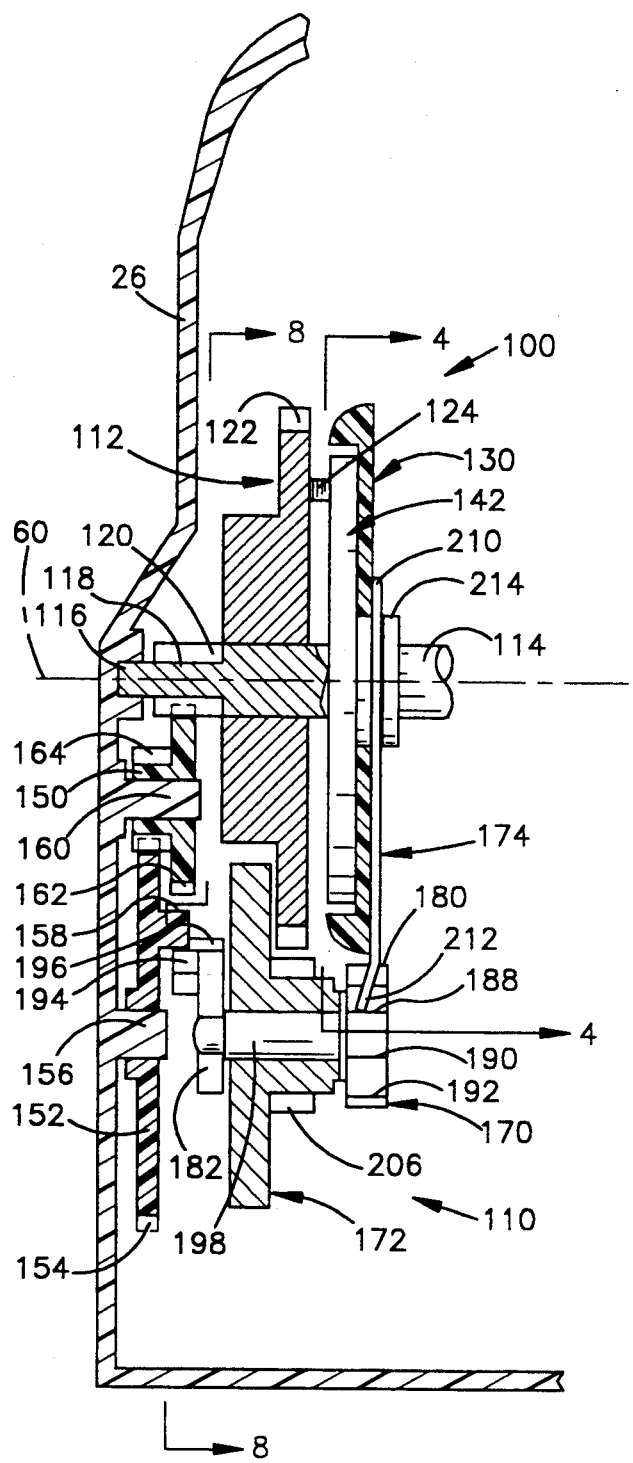
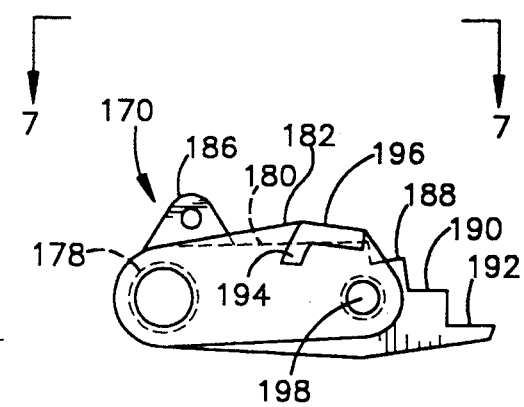
Fig.6
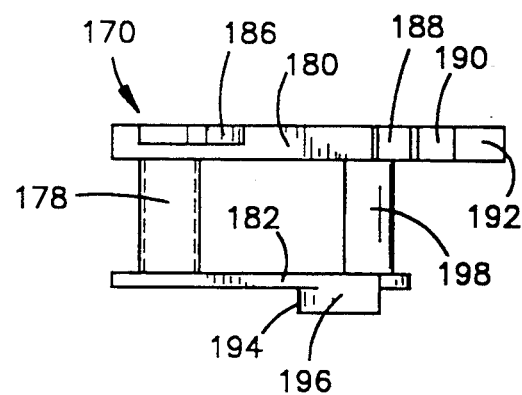
Fig.7
Fig.3

SEAT BELT RETRACTOR WITH DUAL SENSITIVITY

FIELD OF THE INVENTION

The present invention relates to a seat belt retractor, and particularly relates to a seat belt retractor having a web-sensitive locking mechanism.

BACKGROUND OF THE INVENTION

U.S. Pat. No. 5,014,926 discloses a seat belt retractor having a web-sensitive locking mechanism. The seat belt retractor disclosed in the '926 patent has a rotatable spool upon which seat belt webbing is wound. The webbing has a retracted position in which it is located beside a vehicle seat, and has an extended position in which it extends around a seated vehicle occupant. The spool in the retractor rotates in an unwinding direction as the webbing is withdrawn from the retractor upon movement of the webbing from the retracted position toward the extended position. A rewind spring in the retractor rotates the spool oppositely in a winding direction to retract the webbing back into the retractor, and thus to move the webbing back from the extended position toward the retracted position.

The web-sensitive locking mechanism operates to block rotation of the spool in the unwinding direction upon the occurrence of a vehicle collision. When the vehicle experiences a collision, a vehicle occupant wearing the seat belt webbing moves suddenly against the webbing. This causes the spool to accelerate suddenly in the unwinding direction. The web-sensitive locking mechanism includes a flywheel which lags rotation of the spool when the spool accelerates in the unwinding direction at a predetermined rate which indicates the occurrence of a collision. The web-sensitive locking mechanism blocks rotation of the spool in the unwinding direction in response to such lagging rotation of the flywheel.

When the vehicle occupant withdraws the webbing from the retractor upon movement of the webbing from the retracted position toward the extended position, it is possible for the vehicle occupant to move the webbing quickly enough for the spool to accelerate in the unwinding direction at the predetermined rate. The vehicle occupant can thus move the webbing quickly enough to actuate the web-sensitive locking mechanism before the webbing is moved fully to its extended position. If the web-sensitive locking mechanism is actuated in this manner, the vehicle occupant can allow the rewind spring to retract the webbing back into the retractor until the web-sensitive locking mechanism releases the spool to allow the spool again to rotate in the unwinding direction.

SUMMARY OF THE INVENTION

In accordance with the present invention, a seat belt retractor includes a spool having means for holding seat belt webbing on the spool. The spool is supported to rotate in winding and unwinding directions. The retractor further includes a primary inertia member, and means for supporting the primary inertia member to rotate upon rotation of the spool. The primary inertia member rotates with the spool upon acceleration of the spool at a rate below a first predetermined rate. The primary inertia member lags rotation of the spool upon acceleration of the spool at a rate above the first predetermined rate.

The retractor further includes blocking means and sensitivity adjusting means. The blocking means blocks rotation of the spool in the unwinding direction when the primary inertia member lags rotation of the spool. The sensitivity adjusting means, when actuated, causes the primary inertia member to lag rotation of the spool upon acceleration of the spool at a second predetermined rate below the first predetermined rate.

The sensitivity adjusting means includes a secondary inertia member and a switching means. The secondary inertia member has a loading condition in which the mass of the secondary inertia member is applied to the primary inertia member effectively to increase the inertia of the primary inertia member. The secondary inertia member also has a non-loading condition in which the mass of the secondary inertia member is not applied to the primary inertia member. The switching means switches the secondary inertia member between the loading and non-loading conditions in response to rotation of the spool.

A seat belt retractor constructed in accordance with the present invention enables a vehicle occupant to move the seat belt webbing rapidly from the retracted position to the extended position without actuating the web-sensitive locking mechanism. When the spool rotates in the unwinding direction upon movement of the webbing from the retracted position toward the extended position, the secondary inertia member is maintained in the non-loading condition. The blocking means will then block rotation of the spool upon acceleration of the spool in the unwinding direction at a rate above the first predetermined rate. However, the first predetermined rate is greater than the rate at which a vehicle occupant ordinarily will withdraw the webbing from the spool, even when doing so rapidly. After the vehicle occupant has fastened the webbing in the extended position, the switching means switches the secondary inertia member into the loading condition. The blocking means will then block rotation of the spool upon acceleration of the spool in the unwinding direction at the second predetermined rate, which is below the first predetermined rate. The retractor thus operates at a greater level of sensitivity after the webbing is secured around the vehicle occupant.

In a preferred embodiment of the present invention, the primary inertia member is a first flywheel having first gear teeth. The second inertia member is a second flywheel having second gear teeth. The second gear teeth on the second flywheel are spaced from the first gear teeth on the first flywheel when the second flywheel is in the non-loading condition. The second gear teeth on the second flywheel mesh with the first gear teeth on the first flywheel when the second flywheel is in the loading condition. The second flywheel is thus rotatably driven by the first flywheel when the second flywheel is in the loading condition.

In accordance with another feature of the present invention, the blocking means and the sensitivity adjusting means operate independently of the force of gravity. The retractor can, therefore, be mounted in the vehicle at any angle of inclination or to move between different angles of inclination.

BRIEF DESCRIPTION OF THE DRAWINGS

The foregoing and other features of the present invention will become apparent to those skilled in the art to which the present invention relates from reading the following description with reference to the accompanying drawings, in which:

FIG. 1 is a view of a vehicle seat belt system constructed as a first embodiment of the present invention;

FIG. 2 is an exploded perspective view of parts of the apparatus of FIG. 1, with certain parts shown schematically;

FIG. 3 is a view of parts shown in FIG. 2;

FIG. 6 is a side view of a part shown in FIG. 3;

FIG. 7 is a view taken on line 7—7 of FIG. 6;

DESCRIPTION OF PREFERRED EMBODIMENTS

Figure 5:
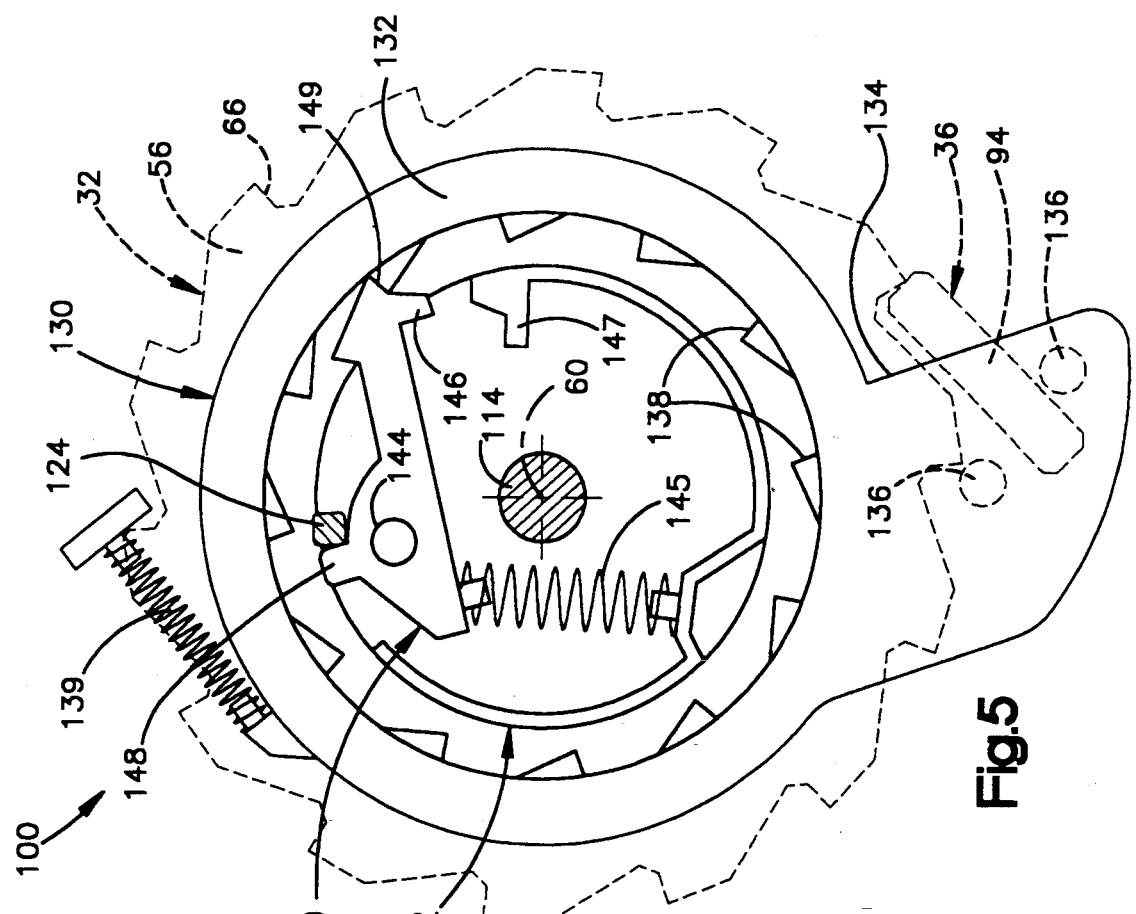
FIG. 5 is a view showing the parts of FIG. 4 in different positions.

A first embodiment of the present invention is shown in FIGS. 1-9. As shown in FIG. 1, a vehicle occupant restraint system 10 constructed in accordance with the present invention includes a retractor 12. The system 10 further includes a D-ring 14, a locking tongue 16 and an anchor 18. A length of seat belt webbing 20 extends from the retractor 12 to the anchor 18 through the D-ring 14 and the tongue 16.

The seat belt webbing 20 is movable back and forth between a retracted position and an extended position upon winding and unwinding of the webbing 20 on the retractor 12. When the webbing 20 is in the retracted position, as shown partially in dashed lines in FIG. 1, it is located beside an associated vehicle seat 22. When the webbing 20 is in the extended position, as shown in solid lines in FIG. 1, it is unwound from the retractor 12 sufficiently to enable the tongue 16 to reach a buckle 24 at the other side of the seat 22.

As shown in FIG. 1, the retractor 12 has a housing 26. Other parts of the retractor 12 are shown in FIG. 2, including a frame 30, a spool 32, a rewind spring 34 and a lock bar 36.

The frame 30 of the retractor 12 has a base wall 40 and a pair of side walls 42. Each of the side walls 42 of the frame 30 has a first inner edge surface 44 which defines a circular opening centered on an axis 46. Each of the side walls 42 of the frame 30 also has a second inner edge surface 48 which defines a somewhat triangular opening. The openings defined by the second inner edge surfaces 48 are aligned with each other across the space between the side walls 42 of the frame 30.

The spool 32 includes a reel 50 and a shaft 52. The reel 50 includes a cylindrical sleeve 54 and a pair of ratchet wheels 56 and 58. The sleeve 54 has a longitudinal central axis 60 and a pair of longitudinal edge surfaces 62. The longitudinal edge surfaces 62 of the sleeve 54 are spaced from each other circumferentially, and thus define a slot 64 extending along the length of the sleeve 54. The ratchet wheels 56 and 58 are fixed coaxially to the opposite ends of the sleeve 54. Each of the ratchet wheels 56 and 58 has a circumferentially extending row of ratchet teeth 66. Each of the ratchet wheels 56 and 58 also has an inner edge surface which defines an opening centered on the axis 60. The inner edge surface 68 of the first ratchet wheel 56 is shown in FIG. 2, and defines a D-shaped opening. The inner edge surface of the second ratchet wheel 58 is not shown in FIG. 2. That inner edge surface defines a circular opening.

The shaft 52 has a first end portion 70 and a second end portion 72. The first end portion 70 of the shaft 52 has a D-shaped cross section which is defined in part by a flat surface 74 of the shaft 52. The second end portion 72 of the shaft 52 has a circular cross section, and includes a longitudinally extending slot 76.

The shaft 52 has an assembled position extending coaxially through the reel 50, with the first and second end portions 70 and 72 of the shaft 52 extending outward through the central openings in the first and second ratchet wheels 56 and 58, respectively. The flat surface 74 of the shaft 52 then abuts the flat portion of the inner edge surface 68 of the first ratchet wheel 56 to block rotation of the reel 50 and the shaft 52 relative to each other about the axis 60. The shaft 52 retains an end portion of the seat belt webbing 20 (FIG. 1) that extends through the slot 64 in the sleeve 54 and is sewn in a loop around the shaft 52.

The first and second end portions 70 and 72 of the shaft 52 further extend coaxially outward through the circular openings in the side walls 42 of the frame 30. The shaft 52 thus supports the spool 32 for rotation in the frame 30 in opposite directions about the axis 60. When the spool 32 rotates in a seat belt winding direction (counterclockwise as viewed in FIG. 2), the webbing 20 is wound onto the spool 32 and is moved toward the retracted position. The spool 32 rotates oppositely in a seat belt unwinding direction (clockwise as viewed in FIG. 2) as the webbing 20 is unwound from the spool 32 and moved toward the extended position.

The rewind spring 34 has an inner end portion 80 and an outer end portion 84. The inner end portion 80 of the rewind spring 34 extends into the slot 76 in the second end portion 72 of the shaft 52. The outer end portion 84 of the rewind spring 34 is fixed to the retractor housing 26 (FIG. 1) in a known manner. The rewind spring 34 is thus connected with the spool 32 to exert a bias that resists clockwise rotation of the spool 32 in the unwinding direction as the webbing 20 is moved toward the extended position and that rotates the spool 32 counterclockwise back in the winding direction to wind the webbing 20 back onto the spool 32.

The lock bar 36 has a central portion 90 and a pair of locking portions 92 and 94 extending from the central portion 90. Each of the locking portions 92 and 94 has an outer edge surface 96. When the retractor 12 is assembled, the lock bar 36 extends between the side walls 42 of the frame 30, with each of the locking portions 92 and 94 being received in a respective one of the generally triangular openings defined by the second inner edge surfaces 48 of the side walls 42. The locking portion 94, which is wider than the other locking portion 92, projects outwardly from the associated side wall 42 of the frame 30. The lock bar 36 is movable pivotally into and out of a locking position in which the outer edge surfaces 96 of the locking portions 92 and 94 are located in the paths of movement of the ratchet teeth 66 to block rotation of the spool 32 in the unwinding direction.

As shown schematically in FIG. 2, the retractor 12 further includes a web-sensitive locking mechanism 100 and a sensitivity adjusting mechanism 110. The web-sensitive locking mechanism 100 operates to move the lock bar 36 into the locking position upon the occurrence of a collision. When the vehicle experiences a collision, a vehicle occupant wearing the seat belt webbing 20 moves suddenly against the webbing 20. This causes the spool 32 to accelerate suddenly in the unwinding direction. The web-sensitive locking mechanism 100 senses when the spool 32 accelerates in the unwinding direction at a rate which is indicative of such sudden movement of a vehicle occupant. The web-sensitive locking mechanism 100 moves the lock bar 36 pivotally into the locking position upon sensing such a rate of spool acceleration so that the webbing 20 will restrain the vehicle occupant.

Parts of the web-sensitive locking mechanism 100 are shown in detail in FIG. 3. As shown in FIG. 3, the webs-sensitive locking mechanism 100 includes a primary flywheel 112 and an extension 114 on the shaft 52. The shaft extension 114 has an outer end portion 116 which is supported by the retractor housing 26 for rotation about the axis 60. The shaft extension 114 includes a pinion gear 118 with gear teeth 120 adjacent to the outer end portion 116. The pinion gear 118 rotates with the spool 32 in the winding and unwinding directions about the axis 60.

The primary flywheel 112 has gear teeth 122 and is supported on the shaft extension 114 to rotate relative to the shaft extension 114 about the axis 60. A control pin 124 projects axially from one side of the primary flywheel 112.

Figure 4:
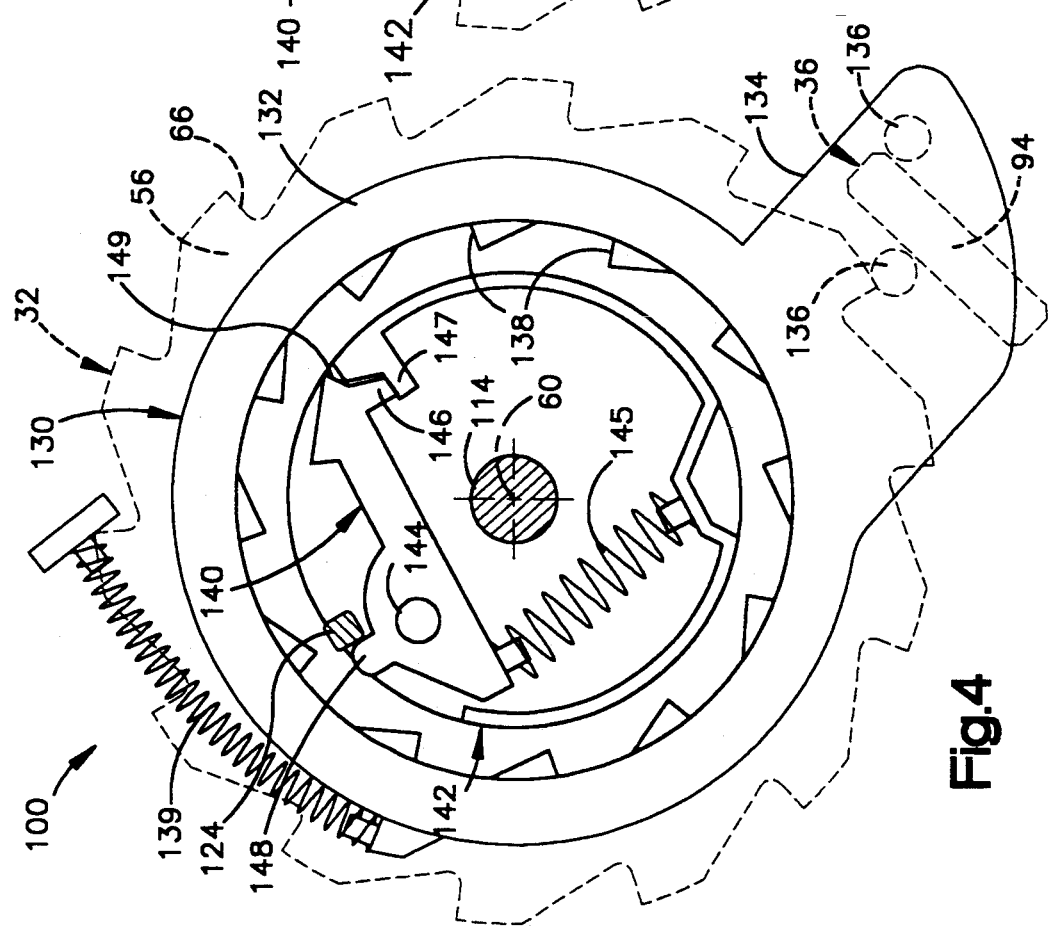
FIG. 4 is a view taken on line 4—4 of FIG. 3, with certain parts omitted for clarity of illustration.

The web-sensitive locking mechanism 100 further includes an actuator 130. As shown in FIGS. 4 and 5, the actuator 130 has a generally circular body portion 132 and an arm 134 extending radially from the body portion 132. The arm 134 supports a pair of lugs 136 which extend across opposite sides of the locking portion 94 of the lock bar 36 (FIG. 1). The body portion 132 of the actuator 130 has a plurality of inwardly directed ratchet teeth 138, and is supported for rotation about the axis 60 relative to the shaft extension 114. The actuator 130 is thus rotatable about the axis 60 in a clockwise direction from an unactuated position, as shown in FIG. 4, to an actuated position, as shown in FIG. 5. When the actuator 130 moves clockwise from the unactuated position to the actuated position, the lugs 136 on the arm 134 move against the locking portion 94 of the lock bar 36 to pivot the lock bar 36 into the locking position. When the actuator 130 moves counterclockwise back from the actuated position to the unactuated position, the lugs 136 on the arm 134 move the lock bar 36 back out of the locking position. A spring 139 is mounted between the actuator 130 and the adjacent sidewall 42 and biases the actuator 130 in the counterclockwise direction. The actuator 130 and the lock bar 36 cooperate in the foregoing manner independently of the direction in which the force of gravity urges any parts of the retractor 12 to move relative to each other.

In an alternative embodiment of the invention, the actuator 130 and the lock bar 36 could cooperate differently so that the lock bar 36 would move into the locking position under the influence of the force of gravity in a vehicle rollover event. For example, one such alternative embodiment of the invention would omit the lug 136 which is located to the left of the lock bar 36 as viewed in FIGS. 4 and 5. In the absence of the lug 136 which is located to the left of the lock bar 36, the lock bar 36 would be free to move pivotally toward the ratchet teeth 66 when the actuator 130 is in the unactuated position of FIG. 4. The lock bar 36 would thus be free to move pivotally into the locking position under the influence of the force of gravity in a vehicle rollover event.

Referring again to the first embodiment of the invention as further shown in FIGS. 3–5, a control pawl 140 and a pawl carrier 142 are associated with the actuator 130. The pawl carrier 142 is a generally circular member located coaxially within the body portion 132 of the actuator 130. The pawl carrier 142 is fixed to the shaft extension 114 and rotates with the shaft extension 114 about the axis 60. The control pawl 140 is carried on a hub 144 on the pawl carrier 142, and is rotatable about the hub 144. A spring 145 is mounted between the control pawl 140 and the pawl carrier 142. The spring 145 urges the control pawl 140 to rotate about the hub 144 in a clockwise direction, as viewed in FIGS. 4 and 5. The spring 145 normally holds the control pawl 140 in a position in which an end portion 146 of the control pawl 140 abuts a stop member 147 on the pawl carrier 142, as shown in FIG. 4. A control tab 148 on the control pawl 140 adjoins the control pin 124 on the primary flywheel 112.

When a vehicle occupant moves the seat belt webbing from the retracted position toward the extended position, the spool 32 rotates in the clockwise direction as viewed in FIGS. 4 and 5. The shaft extension 114, and the pawl carrier 140 which is fixed to the shaft extension 114, rotate in the clockwise direction with the spool 32. The control tab 148 on the control pawl 140 moves against the control pin 124 on the primary flywheel 112 to rotate the primary flywheel 112 in the clockwise direction with the pawl carrier 142. The primary flywheel 112 thus ordinarily rotates about the shaft extension 114 with the pawl carrier 142 when the vehicle occupant moves the seat belt webbing 20 toward the extended position.

When the vehicle experiences a collision, a vehicle occupant wearing the seat belt webbing 20 moves suddenly against the webbing 20 and causes the spool 32 to accelerate in the clockwise direction, as described above. The shaft extension 114, the pawl carrier 142 and the control pawl 140 accelerate with the spool 32 in the clockwise direction. However, when those parts accelerate at or above a first predetermined rate, the inertia of the primary flywheel 112 causes the primary flywheel 112 to lag rotation of those parts. When the primary flywheel 112 lags rotation of the pawl carrier 142 in the clockwise direction, the control pin 124 on the primary flywheel 112 moves relative to the pawl carrier 142 in the counterclockwise direction as viewed in FIGS. 4 and 5. The control pin 124 then moves against the control tab 148 on the control pawl 140 and rotates the control pawl 140 in the counterclockwise direction about the hub 144. The control pin 124 thus moves the control pawl 140 against the bias of the spring 145 from the position shown in FIG. 4 toward the position shown in FIG. 5. The end portion 146 of the control pawl 140 then moves radially outward from the pawl carrier 142 and, as the control pawl 140 continues to rotate clockwise about the axis 60 with the pawl carrier 142, a pawl tooth 149 on the control pawl 140 moves into abutting engagement with one of the ratchet teeth 138 on the actuator 130. Further clockwise rotation of the pawl carrier 142 with the spool 32 is then imparted to the actuator 130 by the control pawl 140 so that the actuator 130 is moved in the clockwise direction from its unactuated position to its actuated position. The lock bar 36 is thus moved into its locking position to block further rotation of the spool 32 in the unwinding direction. The pawl carrier 140 and the control pawl 142 also cooperate in the foregoing manner independently of the direction in which the force of gravity urges any parts of the retractor 12 to move relative to each other.

As thus far described, the web sensitive locking mechanism 100 operates to block rotation of the spool 32 in the unwinding direction when the spool 32 accelerates in the unwinding direction at or above the first predetermined rate. The first predetermined rate is a rate which indicates the occurrence of a collision, but is greater than a rate at which the vehicle occupant ordinarily would accelerate the spool 32 when moving the webbing 20 from the retracted position toward the extended position. Therefore, the vehicle occupant ordinarily will not actuate the vehicle sensitive locking mechanism 100 when donning the webbing 20.

The sensitivity adjusting mechanism 110 operates to adjust the sensitivity of the web-sensitive locking mechanism 100. When the web-sensitive locking mechanism 100 has been adjusted by the sensitivity adjusting mechanism 110, it will move the lock bar 36 into the locking position upon acceleration of the spool 32 in the unwinding direction at or above a second predetermined rate which is lower than the first predetermined rate. The sensitivity adjusting mechanism 110 thus increases the sensitivity of the web-sensitive locking mechanism 100 to acceleration of the spool 32 in the unwinding direction. The increased level of sensitivity of the web-sensitive locking mechanism 100 is desirable after the seat belt webbing 20 has been unwound from the spool 32 and fastened around the vehicle occupant.

As shown in FIG. 3, the sensitivity adjusting mechanism 110 includes a dual gear 150 and a switching gear 152. The switching gear 152 has gear teeth 154, and is supported to rotate about a hub portion 156 of the retractor housing 26. The switching gear 152 also has an axially-projecting switching lug 158. The dual gear 150 is supported to rotate about another hub portion 160 of the retractor housing 26. The dual gear 150 has first gear teeth 162 which mesh with the gear teeth 120 on the pinion gear 118. The dual gear 152 also has second gear teeth 164 which mesh with the gear teeth 154 on the switching gear 152. The dual gear 150 is thus engaged with the shaft extension 114 and the switching gear 152 to rotate the switching gear 152 upon rotation of the shaft extension 114.

The sensitivity adjusting mechanism 110 further includes a yoke 170, a secondary flywheel 172 and a clutch member 174. As shown in FIGS. 6 and 7, the yoke 170 includes a base hub 178 and first and second arms 180 and 182 extending generally parallel to one another from opposite ends of the base hub 178. The first arm 180 has an inner end portion which supports a lifting tab 186, and has an outer end portion which includes a plurality of step surfaces 188, 190 and 192. The second arm 182 has an outer end portion with a cam 194. The cam 194 has a cam surface 196. The yoke 170 further includes an outer hub 198 extending between the outer end portions of the first and second arms 180 and 182.

The yoke 170 is supported in the retractor 12 with the base hub 178 received over a post 200 (FIG. 8) which is fixed to the adjacent side wall 42 of the retractor frame 30. The yoke 170 is movable on the post 200 pivotally back and forth between the positions shown in FIGS. 8 and 9. A spring 202 is mounted between the side wall 42 and the lifting tab 186. The spring 202 urges the yoke 170 to move pivotally about the post 200 in a counterclockwise direction, as viewed in FIGS. 8 and 9.

Figure 9:
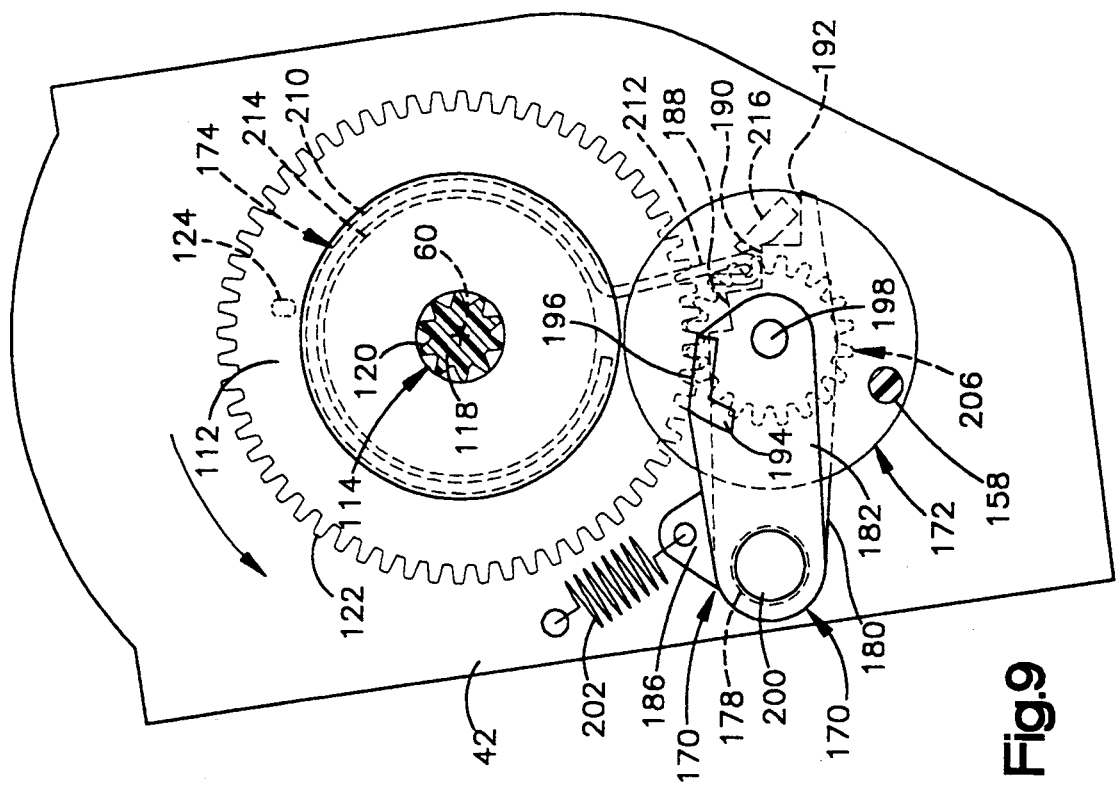
FIG. 9 is a view showing the parts of FIG. 8 in different positions.
Figure 8:
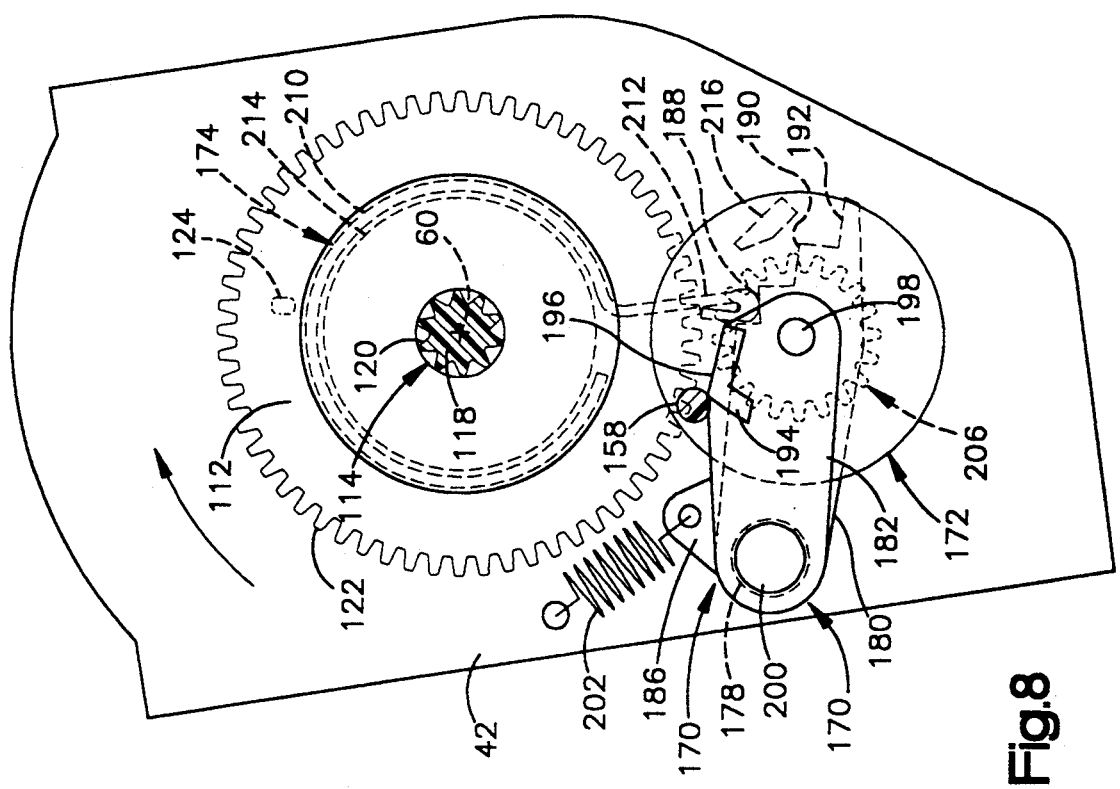
FIG. 8 is a view taken on line 8—8 of FIG. 3, with certain parts omitted for clarity of illustration.

The secondary flywheel 172 has gear teeth 206, and is supported on the outer hub 198 of the yoke 170 to rotate about the outer hub 198. Additionally, the secondary flywheel 172 is carried by the yoke 170 back and forth between the positions shown in FIGS. 8 and 9 upon pivotal movement of the yoke 170 on the post 200. Specifically, the secondary flywheel 172 has a non-loading position in which the gear teeth 206 on the secondary flywheel 172 are spaced from the gear teeth 122 on the primary flywheel 112, as shown in FIG. 8. The secondary flywheel 172 also has a loading position in which the gear teeth 206 on the secondary flywheel 172 mesh with the gear teeth 122 on the primary flywheel 112, as shown in FIG. 9. The secondary flywheel 172 is rotatably driven by the primary flywheel 112 when in the loading position. The mass of the secondary flywheel 172 is thus applied to the primary flywheel 112 effectively to increase the inertia of the primary flywheel 112 when the secondary flywheel 172 is in the loading position.

The clutch member 174 is a metal wire having a base portion 210 and an end portion 212. The base portion 210 of the clutch member 174 extends circumferentially around a hub 214 on the pawl carrier 142. The hub 214 rotates about the axis 60 with the shaft extension 114 and the spool 32. The end portion 212 of the clutch member 174 is located between the yoke 170 and a block 216. The block 216 projects outwardly from the adjacent side wall 42 of the retractor frame 30.

The clutch member 174 is located in the position shown in FIG. 8 when the seat belt webbing 20 is in the retracted position. The end portion 212 of the clutch member 174 then abuts the uppermost step surface 188 on the yoke 170, and holds the yoke 170 and the secondary flywheel 172 from moving pivotally upward under the influence of the spring 202.

When the vehicle occupant moves the seat belt webbing 20 from the retracted position toward the extended position, the spool 32 and the shaft 122 rotate in the unwinding direction as indicated by the arrow shown in FIG. 8. The dual gear 150 then rotates the switching gear 152 so that the switching lug 158 on the switching gear 152 moves in a clockwise direction from the position shown in FIG. 8 toward the position shown in FIG. 9. After the vehicle occupant has locked the tongue 16 into the buckle 24 (FIG. 1), the webbing 20 is retracted slightly as the vehicle occupant leans back in the seat 22 and/or as slack in the webbing 20 is taken up by the rewind spring 34. The spool 32 then rotates a short distance in the winding direction, as indicated by the arrow shown in FIG. 9. The hub 214 then carries the clutch member 174 in the counterclockwise direction until the end portion 212 of the clutch member 174 is stopped by the block 216. The hub 214 thereafter continues rotating with the spool 32 in the counterclockwise direction in sliding contact with the base portion 210 of the clutch member 174. The end portion 212 of the clutch member 174 is thus moved off of the uppermost step surface 188 on the yoke 170, and the yoke 170 is released to carry the secondary flywheel 172 pivotally upward into the loading position under the influence of the coil spring 202.

As described above, the mass of the secondary flywheel 172 is applied to the primary flywheel 112 effectively to increase the inertia of the primary flywheel 112 when the secondary flywheel 172 is in the loading position. The increased inertia of the primary flywheel 112 will cause the primary flywheel 112 to lag rotation of the spool 32 upon acceleration of the spool 32 in the unwinding direction at a second predetermined rate which is lower than the first predetermined rate. The web-sensitive locking mechanism 100 thus operates at an increased level of sensitivity corresponding to the increased inertia of the primary flywheel 112 when the webbing 20 is fastened around the vehicle occupant.

When the vehicle occupant has unlocked the tongue 16 from the buckle 24, the rewind spring 34 rotates the spool 32 in the winding direction to move the webbing 20 back from the extended position to the retracted position. The switching lug 158 on the switching gear 152 then moves back in a counterclockwise direction from the position shown in FIG. 9 to the position shown in FIG. 8. When the switching lug 158 reaches the cam 194 on the yoke 170, it slides against the cam surface 196 and moves the yoke 170 pivotally downward against the force of the coil spring 202. The secondary flywheel 174 moves downward with the yoke 170 from the loading position to the non-loading position. When the webbing 20 is again withdrawn from the spool 32, the hub 214 moves the clutch member 174 back into the position shown in FIG. 8. The secondary flywheel 172 is then held in the non-loading position by the clutch member 174, and the web-sensitive locking mechanism 100 again operates at the lesser level of sensitivity while the webbing 20 is being moved by the vehicle occupant toward the extended position.

Like the web-sensitive locking mechanism 100, the sensitivity adjusting mechanism 110 operates in the foregoing manner independently of the direction in which the force of gravity urges any parts of the retractor 12 to move relative to each other.

Figure 10:
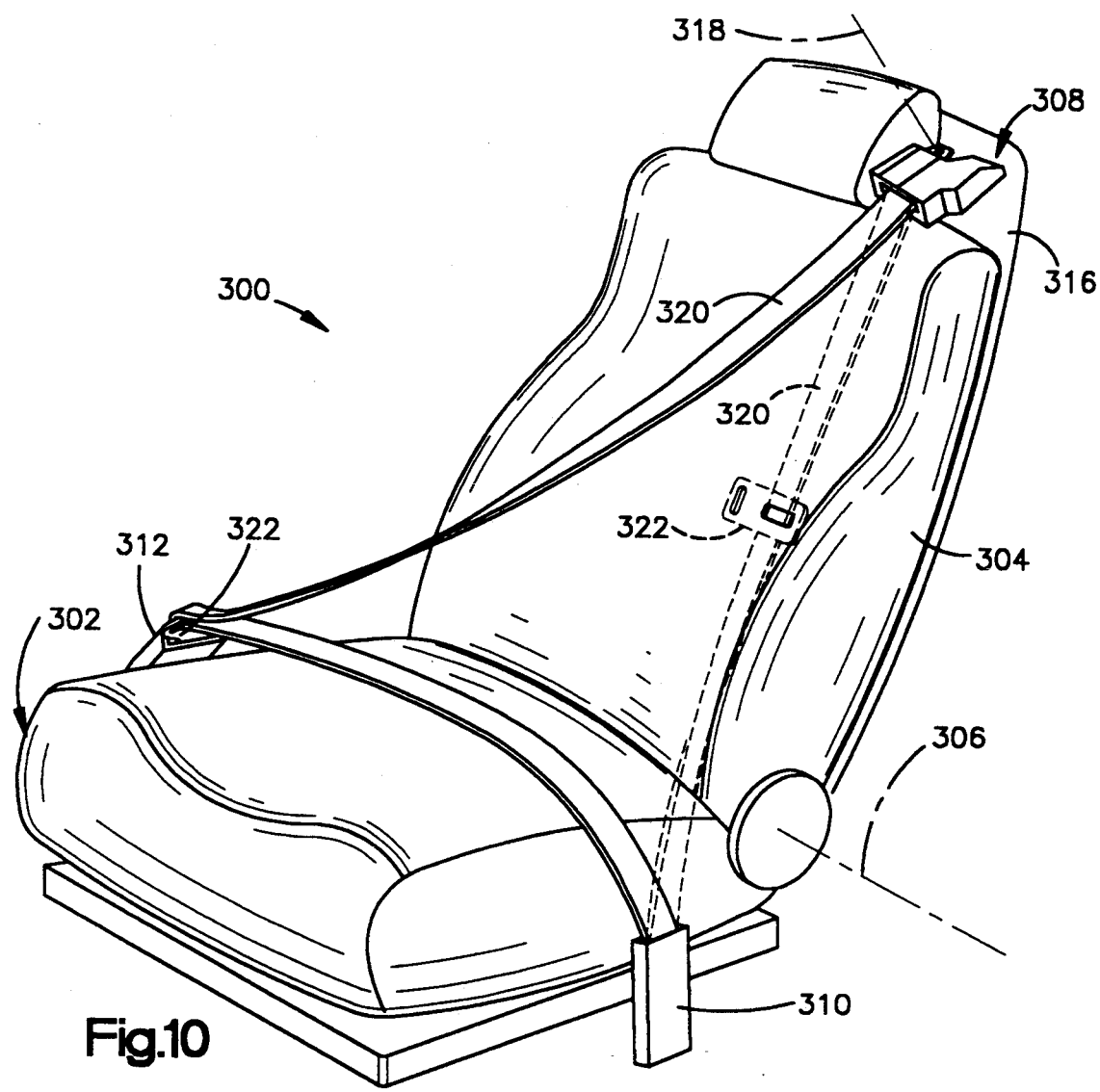
FIG. 10 is a view of a vehicle seat belt system constructed as a second embodiment of the present invention.
Figure 11:
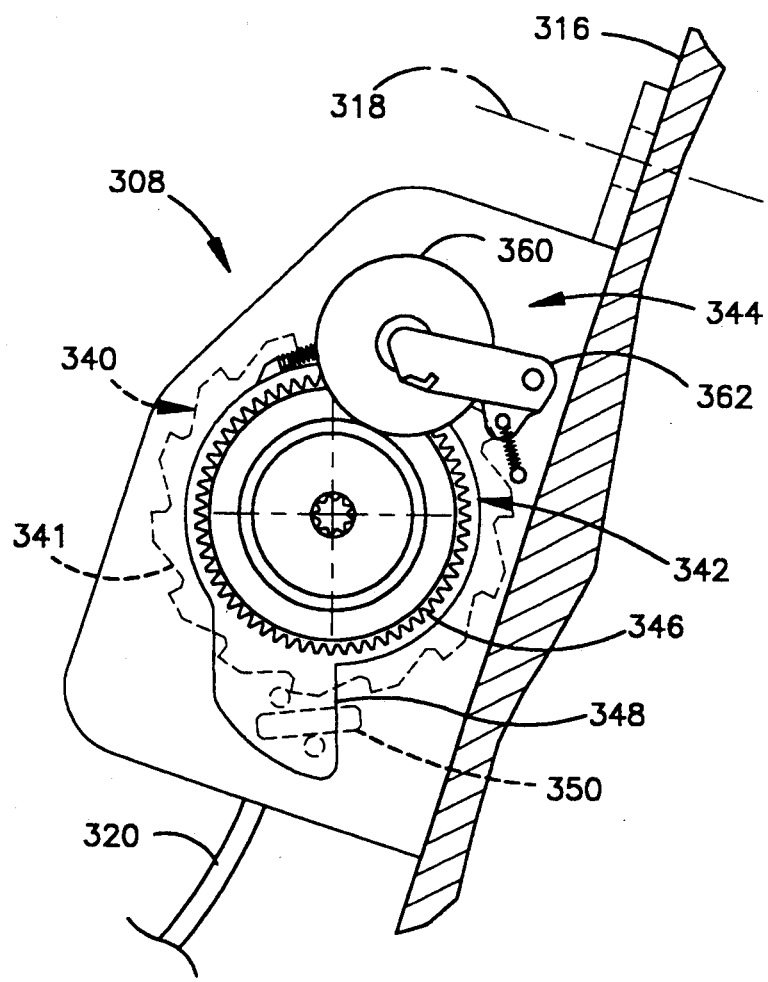
FIG. 11 is a side view of parts of the apparatus of FIG. 10.
Figure 12:
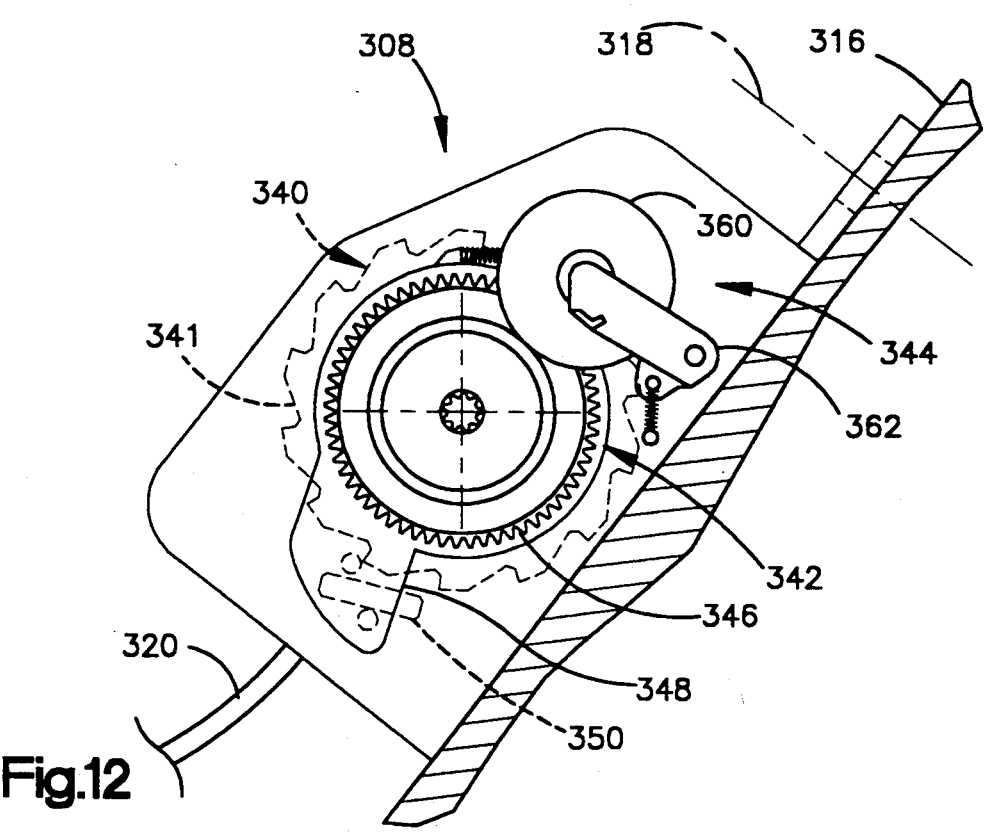
FIG. 12 is a view of the parts of FIG. 11 in different positions.

A second embodiment of the present invention is shown in FIGS. 10–12. As shown in FIG. 10, a vehicle occupant restraint system 300 constructed in accordance with the present invention is associated with a vehicle seat 302. The seat 302 has a seat back 304 which is supported to pivot about a horizontal axis 306 between a plurality of differently inclined positions. The restraint system 300 includes a retractor 308, a webbing anchor 310, and a buckle 312. The retractor 308 is mounted on a shoulder portion 316 of the seat back 304, and is supported to move pivotally relative to the seat back 304 about an inclined axis 318. A length of seat belt webbing 320 extends from the retractor 308 to the webbing anchor 310 through a locking tongue 322. The webbing 320 is movable back and forth between a retracted position, as shown in dashed lines in FIG. 10, and an extended position, as shown in solid lines in FIG. 10. The tongue 322 is lockable in the buckle 312 when the webbing 320 is in the extended position.

The retractor 308 is shown in greater detail in FIGS. 11 and 12. The retractor 308 includes a spool 340 upon which the webbing 320 is wound. The spool 340 has ratchet teeth 341, and operates like the spool 32 described above with reference to the first embodiment of the present invention. The spool 340 thus rotates in a clockwise direction, as viewed in FIGS. 11 and 12, upon withdrawal of the webbing 320 from the spool 340. The spool 340 rotates back in a counterclockwise direction when the webbing 320 is retracted back onto the spool 340 under the influence of a rewind spring (not shown), which also operates as described above.

The retractor 308 further includes a web-sensitive locking mechanism 342 and a sensitivity adjusting mechanism 344. The web-sensitive locking mechanism 342 is constructed like the web-sensitive locking mechanism 100 described above with reference to the first embodiment of the present invention, and thus includes a primary flywheel 346 and an actuator 348. As in the web-sensitive locking mechanism 100, the primary flywheel 346 in the web-sensitive locking mechanism 342 lags rotation of the spool 340 when the spool 340 accelerates in the unwinding direction at or above a first predetermined rate which indicates the occurrence of a collision. When the primary flywheel 346 thus lags rotation of the spool 340, it cooperates with an associated control pawl and an associated pawl carrier (not shown) to cause the actuator 348 to move from an unactuated position to an actuated position. When the actuator 348 moves into the actuated position, it moves an associated lock bar 350 into a position in which the lock bar 350 extends into the path of movement of the ratchet teeth 341 on the spool 340 to block further rotation of the spool 340 in the unwinding direction.

The sensitivity adjusting mechanism 344 in the retractor 308 also is constructed like its counterpart in the first embodiment of the present invention. The sensitivity adjusting mechanism 344 thus includes a secondary flywheel 360 which is carried on a yoke 362. As in the sensitivity adjusting mechanism 110 described above, the secondary flywheel 360 in the sensitivity adjusting mechanism 344 is moved back and forth between loading and non-loading positions in response to rotation of the spool 340. Importantly, the secondary flywheel 360 is moved between the loading and non-loading positions independently of the direction in which the force of gravity urges any of the parts of the retractor 308 to move relative to each other. Therefore, the sensitivity adjusting mechanism 344 operates in the same manner as the sensitivity adjusting mechanism 110, even though the sensitivity adjusting mechanism 344 is inverted vertically relative to the sensitivity adjusting mechanism 110 as shown in the drawings. Moreover, the sensitivity adjusting mechanism 344 works equally well in any position taken as a result of movement of the retractor 308 pivotally about the inclined axis 318, or as a result of movement of the seat back 304 pivotally about the horizontal axis 306, as shown for example in FIG. 12.

From the above description of the invention, those skilled in the art will perceive improvements, changes and modifications. For example, a secondary inertia member can be moved axially into and out of engagement with a primary inertia member in accordance with the present invention, although such movement takes place radially in the preferred embodiments of the invention. Such an axially movable secondary inertia member could be moved between loading and non-loading positions by a magnetic force acting against a spring force, with either the magnetic force or the spring force being applied to move the secondary inertia member when the primary inertia member lags rotation of an associated webbing spool. Such improvements, changes and modifications within the skill of the art are intended to be covered by the appended claims.

Having described the invention, the following is claimed:

1. Apparatus comprising:
   a spool having means for holding seat belt webbing on said spool;
   means for supporting said spool to rotate in winding and unwinding directions;
   a primary inertia member;
   means for supporting said primary inertia member to rotate upon rotation of said spool, said primary inertia member rotating with said spool upon acceleration of said spool at a rate below a first predetermined rate, said primary inertia member lagging rotation of said spool upon acceleration of said spool at a rate above said first predetermined rate;
   blocking means for blocking rotation of said spool in said unwinding direction when said primary inertia member lags rotation of said spool; and
   sensitivity adjusting means for causing said primary inertia member to lag rotation of said spool upon acceleration of said spool at a second predetermined rate below said first predetermined rate;
   said sensitivity adjusting means including a rotatable secondary inertia member and switching means, said secondary inertia member having a loading condition in which the mass of said secondary inertia member is applied to said primary inertia member effectively to increase the inertia of said primary inertia member, said secondary inertia member further having a non-loading condition in which the mass of said secondary inertia member is not applied to said primary inertia member, said switching means switching said secondary inertia member between said loading and non-loading conditions in response to rotation of said spool.

2. Apparatus as defined in claim 1 wherein said switching means switches said secondary inertia member from said non-loading condition to said loading condition in response to rotation of said spool in said winding direction following a predetermined amount of rotation of said spool in said unwinding direction.

3. Apparatus as defined in claim 1 wherein said secondary inertia member is located in a first position when in said loading condition and is located in a second position when in said non-loading condition, said switching means including a spring means for biasing said secondary inertia member to move from said second position toward said first position.

4. Apparatus as defined in claim 1 wherein said blocking means and said sensitivity adjusting means operate independently of the force of gravity, and further comprising means for mounting said apparatus for movement pivotally about horizontal and vertical axes.

5. Apparatus comprising:
   a spool having means for holding seat belt webbing on said spool;
   means for supporting said spool to rotate in winding and unwinding directions;
   a primary inertia member;
   means for supporting said primary inertia member to rotate upon rotation of said spool, said primary inertia member rotating with said spool upon acceleration of said spool at a rate below a first predetermined rate, said primary inertia member lagging rotation of said spool upon acceleration of said spool at a rate above said first predetermined rate;
   blocking means for blocking rotation of said spool in said unwinding direction when said primary inertia member lags rotation of said spool; and
   sensitivity adjusting means for causing said primary inertia member to lag rotation of said spool upon acceleration of said spool at a second predetermined rate below said first predetermined rate;
   said sensitivity adjusting means including a secondary inertia member and switching means, said secondary inertia member having a loading condition in which the mass of said secondary inertia member is applied to said primary inertia member effectively to increase the inertia of said primary inertia member, said secondary inertia member further having a non-loading condition in which the mass of said secondary inertia member is not applied to said primary inertia member, said switching means switching said secondary inertia member between said loading and non-loading conditions in response to rotation of said spool;
   said primary inertia member being a first flywheel and said secondary inertia member being a second flywheel, said second flywheel being rotatably driven by said first flywheel when said second flywheel is in said loading condition.

6. Apparatus as defined in claim 5 wherein said first flywheel has first gear teeth and said second flywheel has second gear teeth, said second gear teeth meshing with said first gear teeth when said second flywheel is in said loading condition.

7. Apparatus comprising:
   a spool having means for holding seat belt webbing on said spool;
   means for supporting said spool to rotate in winding and unwinding directions;
   a first flywheel;
   means for supporting said first flywheel to rotate upon rotation of said spool, said first flywheel rotating with said spool upon acceleration of said spool in said unwinding direction at a rate below a first predetermined rate, said first flywheel lagging rotation of said spool upon acceleration of said spool in said unwinding direction at a rate above said first predetermined rate;
   means for blocking rotation of said spool in said unwinding direction when said first flywheel lags rotation of said spool; and
   sensitivity adjusting means for causing said first flywheel to lag rotation of said spool upon acceleration of said spool in said unwinding direction at a second predetermined rate below said first predetermined rate;
   said sensitivity adjusting means including a second flywheel and switching means, said second flywheel having a driven position in which said second flywheel is rotatably driven by said first flywheel, said second flywheel further having a non-driven position in which said second flywheel is not rotatably driven by said first flywheel, said switching means moving said second flywheel between said driven and non-driven positions in response to rotation of said spool.

8. Apparatus as defined in claim 7 wherein said switching means moves said second flywheel from said non-driven position to said driven position in response to rotation of said spool in said winding direction following a predetermined amount of rotation of said spool in said unwinding direction.

9. Apparatus as defined in claim 8 wherein said first flywheel has first gear teeth and said second flywheel has second gear teeth, said second gear teeth meshing with said first gear teeth when said second flywheel is in said driven position.

10. Apparatus as defined in claim 9 wherein said switching means moves said second gear teeth radially into and out of meshing engagement with said first gear teeth when said switching means moves said second flywheel into and out of said driven position.

11. Apparatus as defined in claim 10 wherein said switching means includes a spring means for biasing said second flywheel to move toward said first flywheel.

12. Apparatus as defined in claim 11 wherein said switching means moves said second gear teeth radially into meshing engagement with said first gear teeth in response to a first amount of rotation of said spool in said winding direction following a predetermined amount of rotation of said spool in said unwinding direction.

13. Apparatus as defined in claim 12 wherein said switching means moves said second gear teeth radially out of meshing engagement with said first gear teeth in response to a second amount of rotation of said spool in said winding direction following said first amount of rotation of said spool in said winding direction.

14. Apparatus as defined in claim 7 wherein said blocking means and said sensitivity adjusting means operate independently of the force of gravity, and further comprising means for mounting said apparatus for movement pivotally about horizontal and vertical axes.

* * * * *